No. 719,835. PATENTED FEB. 3, 1903.
D. MORIARTY.
VASE.
APPLICATION FILED MAR. 22, 1902.
NO MODEL.
*Fig.1.*
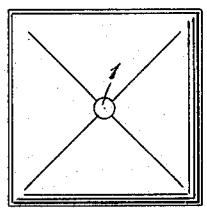
*Fig.2.*
*Fig.3.* *Fig.4.*
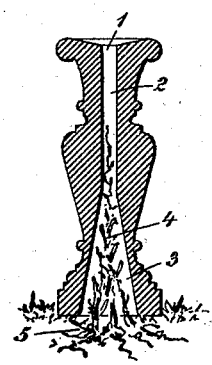 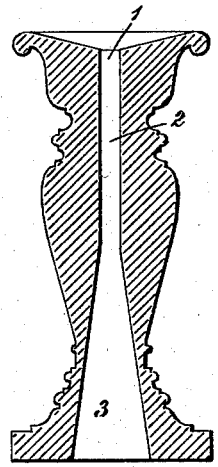 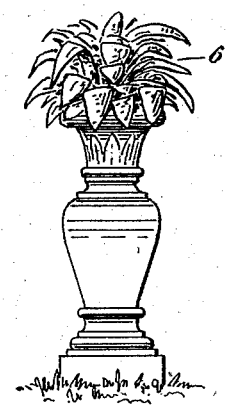
*Fig.5.*
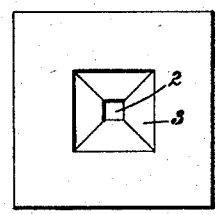
WITNESSES
H. Graban
S. Kern
INVENTOR
Daniel Moriarty

UNITED STATES PATENT OFFICE.

DANIEL MORIARTY, OF NEW ORLEANS, LOUISIANA.

VASE.

SPECIFICATION forming part of Letters Patent No. 719,835, dated February 3, 1903.

Application filed March 22, 1902. Serial No. 99,543. (No model.)

*To all whom it may concern:*

Be it known that I, DANIEL MORIARTY, a citizen of the United States of America, residing at New Orleans, in the parish of Orleans and State of Louisiana, have invented certain new and useful Improvements in Vases, of which the following is a specification, reference being had therein to the accompanying drawings.

My invention relates to an improvement in a vase; and its novelty will be fully understood from the following description and claims when taken in connection with the annexed drawings; and the object of my invention is to provide a vase in which a plant will grow through from the ground and avoid the necessity of continually watering it in order to sustain its life. I attain this object by the mechanism illustrated in the accompanying drawings, in which—

Figure 1 is a top view. Fig. 2 is a vertical section showing opening through vase. Fig. 3 is a vertical section showing plant growing in vase. Fig. 4 is a view of vase with plants in same. Fig. 5 is a bottom view of vase.

Similar numerals refer to similar parts throughout the several views.

In the drawings numeral 1 designates an opening in top of vase.

2 and 3 show interior construction of vase; 4, a plant in vase growing upward through same.

5 shows the ground.

6 designates plants that have been grown in vase.

In constructing my vase metal, marble, terra-cotta, or any desired material may be used, and while I have shown the vase as being made of a solid piece of material I wish it understood that I may construct the same of two, three, or more pieces. Thus in making a large vase I would preferably make the same of three pieces, consisting of the base, the body of the vase, and the top portion.

By having a larger opening in vase, as shown by 3, the plants are not cramped in their growth from the ground, and the openings 2 and 1 are sufficient for sweet peas or other similar plants to climb up through said openings and spread upon the top of vase.

My vases may be constructed of any desired size and in height from one to six feet or more.

In practice I place either seed for growing plants in the ground or the plant itself, and so place the vase that the growing plant will grow upward through the vase, as shown in Fig. 3, and when plant has grown to perfection presents the appearance shown in Fig. 4.

A striking advantage of my invention is that it does not require a vase to be filled with soil and watered to sustain life in the plant, as the roots of the plant being in the earth it derives all that it requires for its sustenance from that source, and the vase virtually becomes a fixture and an ornament in whatever position placed.

I am aware that prior to my invention hollow tiles and like structures having openings in their tops through which the plants could grow have been used, and I do not intend to cover such construction by the claims appended hereto. Such prior devices, so far as I am aware, differ in configuration as well as in construction from a vase and cannot and are not intended to be used for the same purpose, as they entirely lack the height and the ornamental characteristics of a vase.

Vases constructed according to my invention when placed in position are intended to form a permanent ornament in the yard, garden, or other location which may be assigned them and are of relatively great weight and have a highly-ornamental appearance.

Having described my invention and the manner in which the same may be constructed and used, I would say in conclusion that I do not limit myself to the precise details shown in illustration, as the same may be varied to some extent; but

What I claim, and desire to secure by Letters Patent, is—

1. As an article of manufacture a portable structure having the configuration of a vase and provided with a central longitudinal bore or passage extending throughout its whole length, and having an extended base or pedestal adapted to rest upon the ground.

2. As an article of manufacture, a portable structure having the configuration of a vase and being of greater length or height than width and provided with a central longitudinal bore or passage extending throughout its length, and having an extended base or pedestal adapted to rest upon the ground.

3. As an article of manufacture, a solid vase provided with a central passage or bore extending throughout its whole length, and having an extended base or pedestal adapted to rest upon the ground.

4. As an article of manufacture, a solid vase having an extended base or pedestal adapted to rest upon the ground, and provided with a central passage or bore extending throughout its whole length, one end of the passage or bore being larger than the other end.

In testimony whereof I affix my signature in presence of two witnesses.

DANIEL MORIARTY.

Witnesses:
   C. G. REBENTISCH,
   ALPHONSE J. CUNEO.